United States Patent [19]
Bierlein et al.

[11] Patent Number: 5,311,352
[45] Date of Patent: May 10, 1994

[54] INCREASING THE BIREFRINGENCE OF KTP AND ITS ISOMORPHS FOR TYPE II PHASE MATCHING

[75] Inventors: John D. Bierlein, Wilmington; Lap K. Cheng, Bear; Lap-Tak A. Cheng, Newark, all of Del.

[73] Assignee: E. I. Du Pont de Nemours and Company, Wilmington, Del.

[21] Appl. No.: 995,439

[22] Filed: Dec. 23, 1992

[51] Int. Cl.$^5$ .................................. G02F 1/35
[52] U.S. Cl. ........................... 359/326; 252/584
[58] Field of Search .................. 359/326–332; 385/122; 372/21, 22; 252/582, 584, 585

[56] References Cited

U.S. PATENT DOCUMENTS

| | | | |
|---|---|---|---|
| 3,949,323 | 4/1976 | Bierlein et al. | 332/7.51 |
| 5,084,206 | 1/1992 | Ballman et al. | 252/301.4 F |
| 5,157,754 | 10/1992 | Bierlein et al. | 385/122 |
| 5,193,097 | 3/1993 | Bordui et al. | 372/21 |

OTHER PUBLICATIONS

Zumsteg et al., J. Appl. Phy., 47, p. 4980 (Nov. 1976).
Bierlein et al., JOSA B, 6, p. 622, (Apr. 1989).
Risk et al., Appl. Phys. Lett., 55, p. 1179 (Sep. 1989).
Garmash et al., Sov. Tech. Phys. Lett., 12, p. 505 (Oct. 1986).
Gaite et al., J. Phys.: Condens. Matter 3(1991) 7877–7886.
Stenger et al.; J. Phys.: Condens. Matter 1(1989) 4643–4648.
Blasse et al., Mat. Res. Bull., vol. 24, pp. 1099–1102, 1989.
Thomas et al., Solid State Communications, vol. 73, No. 2, pp. 97–100, 1990.
Bierlein et al., Appl. Phys. Lett. 56(18), Apr. 30, 1990, pp. 1725–1727.
Risk et al., Appl. Phys. Lett. 52(2) Jan. 11, 1988, pp. 85–87.
Risk et al., Appl. Phys. Lett. 54(9), Feb. 27, 1989, pp. 789–791.
Baumert et al., Appl. Phys. Lett. 51(26), Dec. 28, 1987, pp. 2192–2194.
Ou et al., Optics Letters, vol. 17, No. 9, May 1, 1992, pp. 640–642.
Risk et al., Optics Letters, vol. 17, No. 10, May 15, 1992, pp. 707–709.
Bierlein et al., Appl. Phys. Lett. 61(26), Dec. 28, 1992.

*Primary Examiner*—John D. Lee

[57] ABSTRACT

Method and device for wavelength conversion using type II phase matching are characterized by employing a crystal consisting essentially of doped $MTiOXO_4$ (wherein M is K, Rb and/or Tl and X is P and/or As) containing Fe, Nb and/or Ta dopant in an amount, totalling at least about 100 ppm, effective to increase the $n_z$-$n_x$ optical birefringence of the doped crystal at least about 0.001 compared to a crystal without the dopant. Generation of output waves of an optical birefringence higher than the highest corresponding optical birefringence of a crystal without the dopant is disclosed. Among the useful crystals are crystals consisting essentially of doped $MTiOXO_4$ containing at least about 100 ppm Ta.

12 Claims, 2 Drawing Sheets

INCREASING THE BIREFRINGENCE OF KTP AND ITS ISOMORPHS FOR TYPE II PHASE MATCHING

FIELD OF THE INVENTION

This invention relates to type II phase matching, and more particularly to the use of birefringent crystals of potassium titanyl phosphate (KTP) and its isomorphs such as potassium titanyl arsenate (KTA) for type II phase matching.

BACKGROUND

Potassium titanyl phosphate (KTP) is an excellent nonlinear optical (NLO) material with numerous nonlinear optical applications. It is widely used for the second harmonic generation (SHG) of Nd: YAG/YLF lasers, sum frequency generation (SFG) of YAG, dye, and diode lasers, and optical parametric oscillation (OPO) in nanosecond to femtosecond regimes. More recently, applications of KTP for SHG and SFG of short wavelength diode lasers in waveguided, intracavity, and external resonator geometries have been rapidly developing. Isomorphs of KTP, such as potassium titanyl arsenate (KTA), are known to have similar nonlinear optical properties. Their application in nonlinear optics is also being developed.

Phase-matching is one of the key considerations for all applications involving frequency conversion. Phase-matching describes a propagation condition in which all electromagnetic waves travel through the NLO material with matching velocities such that the wave vectors total zero. (i.e., for three wave interaction, $\vec{k}_1 + \vec{k}_2 - \vec{k}_3 = 0$; where $\vec{k}_m = \hat{i}\omega_m n_m/c$, and where $\vec{k}_m$, $\omega_m$, $n_m$, and $\hat{i}$ denote the wavevector, frequency, index of refraction, and unit vector of propagation direction for each wave (m=1, 2, or 3) respectively, and c is the speed of light.) For most applications, phase-matching is simply achieved through the use of the natural birefringence in the NLO material. Depending on the polarization states of these waves, birefringence phase-matching is classified as type I and type II. Although KTP is type I phase-matchable for SHG throughout its transparency range, the type I effective nonlinearity is small and therefore not very useful (see F. C. Zumsteg, et al., J. Appl. Phy., 47, p. 4980 (1976)). For type II phase-matched SHG using KTP, where relatively large effective nonlinearity is accessed, the fundamental wavelength is limited to about 994.3 nm and longer, preventing efficient SHG into the technologically important blue region of the visible spectrum. Even for the phase-matchable wavelengths, the phase matching condition is generally very critical, requiring precise control of propagation direction in the material, of the wavelength, and of the material temperature. For KTP, phase-matched SHG of the Nd:YAG laser at 1.064 μm has relatively tolerant conditions; with an angular bandwidth of about 15 mrad-cm, a wavelength bandwidth of about 0.56 nm-cm, and a temperature bandwidth of 25° C.-cm (see J. D. Bierlein, et al., JOSA B, 6, p. 622 (1989)). In addition, double refraction can lead to spatial separation of the fundamental and 2nd harmonic waves (walk-off), limiting the interaction length and significantly reducing the performances in intracavity and resonator SHG applications.

For wavelengths that are phase-matched when propagating along a principle axis (generally known in the art as non-critical or 90° phase-matching) the angular bandwidth restriction is significantly relaxed. For SHG using KTP, a wavelength of, 994.3 nm is noncritically phase-matched (NCPM) along the y axis, affording a broad angular bandwidth of 173 mrad-cm½, a wavelength bandwidth of 0.7 nm-cm, a temperature band width of 175° C.-cm, and zero angular walk-off (see Risk et al., Appl. Phys. Lett., 55, p. 1179 (1989)). Along the x axis, where the effective nonlinearity is twice that along the y axis, the NCPM wavelength is at 1.08 μm, with angular bandwidth that is about four times that of the critically phase-matched case at 1.064 μm as well as zero walk-off (see Garmash et al., Tech. Phys. Lett., 12, p. 505, (1986)). Also, with NCPM the bandwidths decrease as the square-root of crystal length, instead of the linear dependence in critical phase-matching. Clearly, NCPM is highly desirable, especially for applications with long crystals and with multimode lasers. However, for pure KTP, given its natural birefringence and dispersion, NCPM is limited to two discrete wavelengths where there are no convenient laser sources. Similar considerations can be made for KTA and the other KTP isomorphs. There is a need for materials with increased birefringence to provide type II phase matching for other optical wave inputs.

SUMMARY OF THE INVENTION

This invention provides a method for directing electromagnetic radiation into a crystal having nonlinear optical properties to generate output waves from said crystal having a selected wavelength different from the wavelength of input waves to said crystal using type II phase matching. The method is characterized by said crystal consisting essentially of doped $MTiOXO_4$ (wherein M is selected from the group consisting of K, Rb and Tl and mixtures thereof and X is selected from P, As, and mixtures thereof) containing at least one dopant selected from the group consisting of Fe, Nb, and Ta in an amount, totalling at least about 100 ppm, effective to increase the $n_z$-$n_x$ optical birefringence of the doped crystal at least about 0.001 Compared to a crystal without said dopant; and said output waves being generated in said crystal from said input waves at an optical birefringence higher than the highest corresponding optical birefringence of a crystal without said dopant.

This invention also includes a nonlinear optical device comprising a nonlinear optical crystal and input means for directing electromagnetic radiation into said crystal to generate output waves from said crystal having a selected wavelength different from input waves to said crystal using type II phase matching. The device is characterized by said crystal consisting essentially of doped $MTiOXO_4$ (wherein M and X are as described above) containing at least one dopant selected from the group consisting of Fe, Nb, and Ta in an amount, totalling at least about 100 ppm, effective to increase the $n_z$-$n_x$ optical birefringence of the doped crystal at least about 0.001 compared to a crystal without said dopant; and said input means being adapted to provide input waves suitable for generating said output waves at an optical birefringence higher than the highest corresponding optical birefringence of a crystal without said dopant.

This invention also includes crystals consisting essentially of doped $MTiOXO_4$ containing at least about 100 ppm Ta (e.g., Ta-doped KTP).

This invention may be used to achieve type II phase matching for input and output wavelengths and/or for propagation directions which are not possible using corresponding crystals without said dopant.

DETAILED DESCRIPTION

Figure 1:
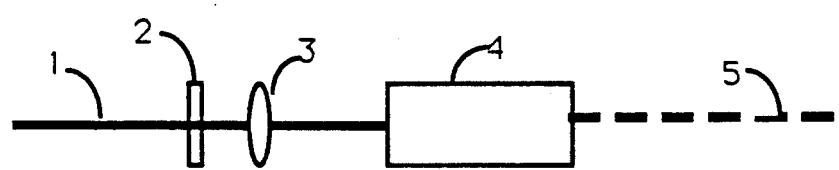
FIG. 1 is a schematic representation of a device using doped KTP or doped KTA for SHG.

In accordance with this invention, iron, niobium and/or tantalum dopant concentrations in NLO crystals of $MTiOXO_4$ (where M is potassium, rubidium and/or thalium and X is phosphorous and/or arsenic) may be adjusted to controllably increase the useful optical birefringence of the resulting crystal. Optical birefringence is direction-dependent within the crystal structure; and is equal to the difference between the refractive index in one direction and the refractive index in another orthogonal direction. Accordingly, a crystal of $MTiOXO_4$ has a $n_z\text{-}n_x$ optical birefringence (used for wave propogation in the y direction), and a $n_z\text{-}n_y$ optical birefringence (used for propogation in the x direction). In general, doping in accordance with this invention will increase both the $n_z\text{-}n_x$ and the $n_z\text{-}n_y$ optical birefringence. Accordingly, type II phase matching may be obtained in both the x and y propogation directions at higher birefringence than the highest corresponding optical birefringence (i.e., the highest optical birefringence in the corresponding direction) of a crystal without the dopant(s) of this invention. The dopant generally influences refractive index, phase-matched SHG angle, and cut-off wavelength measurements. Of note are embodiments where, by providing sufficient iron, niobium and/or tantalum dopant concentrations in single crystals of KTP and KTA, the optical birefringence can be controllably increased, allowing for the blue shifting of the type II phase-matched SHG and SFG cut-off and tuning of the NCPM wavelengths.

In general, it is desirable to provide sufficient dopant to increase the $n_z\text{-}n_x$ optical birefringence by at least about 0.001. The $n_z\text{-}n_y$ optical birefringence will also increase and typically sufficient dopant is used so that both the $n_z\text{-}n_x$ and $n_z\text{-}n_y$ optical birefringence will increase by at least about 0.001. Generally, to achieve this effect at least about 100 ppm (by weight), total, of Fe, Nb, and/or Ta is needed. Typically, where Nb and/or Ta is used as dopant at least about 500 ppm is provided. Where Nb is used as the dopant, it is preferred to incorporate no more than about 230,000 ppm, and more preferably no more than about 90,000 ppm of Nb dopant into the crystal. Where Ta is used as the dopant, it is preferred to incorporate no more than about 370,000 ppm and more preferably no more than about 167,000 ppm Ta dopant into the crystal. Where iron is used as a dopant it is preferred to use at least about 300 ppm, particularly where Fe is used without Nb and/or Ta. Preferably, the crystal is doped with no more than about 40,000 ppm Fe, more preferably no more than about 20,000 ppm Fe. Nevertheless, it is possible to provide even higher levels of iron dopant, particularly where iron is mixed with other dopants, and iron levels of about 60,000 ppm, or even more may be used, particularly where mixtures of Fe with Nb and/or Ta are used. Ta-doped crystals of $MTiOXO_4$ provided in accordance with this invention (e.g., doped $KTiOPO_4$ containing at least about 100 ppm Ta) are particularly noted as novel compositions with high $n_z\text{-}n_x$ optical birefringence.

Doping with Nb and/or Ta in accordance with this invention is believed to replace the M and Ti components of the crystal with dopant to provide an approximate crystal formula $M_{1-x}Ti_{1-x}D_xOPO_4$ where D is the dopant (Nb and/or Ta) and x is the replacement fraction. It is believed that iron dopant may operate by a different mechanism. While dopants may be used up to the mm2 structural stability limit of the crystal, it is preferred to limit the Nb and/or Ta so that x, the replacement fraction, is no more than about 0.5, and more preferred to limit doping so that x is no more than about 0.2.

The increased optical birefringence provided by doping in accordance with this invention may be used in various ways. Doping allows type II phase matching for optical wave combinations which are not phase-matched using corresponding undoped crystals. For example, SHG may be achieved for optical waves having a higher frequency. Doping can also result in new type II propagation directions through the crystal for optical wave combinations (which may or may not be phase-matched in other directions using undoped crystals).

The dopant effect of this invention may be used to provide materials with a desired birefringence for a variety of NLO applications. For example, the dopant effect may be used to blue shift the cut-off wavelength to allow for type II SHG of wavelength less than 994 nm for KTP; and less than 1.074 $\mu$m for KTA. The dopant effect may also be used to tune the NCPM wavelengths, either for x or y propagation, to known laser wavelengths. In particular, dopant control of birefringence can be used to provide NCPM at room temperature for the Nd:YAG lasers at 1.064 $\mu$m and 946 nm, the Nd:YLF laser at 1.053 $\mu$m, the Nd:YAP laser at 1.08 $\mu$m, the Nd:glass laser at 1.06 $\mu$m, all diode lasers with output between 700 nm to beyond 1 $\mu$m, and the tunable output of Ti:sapphire laser.

The dopant effect may be used in SFG applications, to tune the birefringence to achieve NCPM for the wavelength of interest. For example, NCPM SFG with x or y propagation of 946 nm Nd:YAG and 808.5 nm diode-laser outputs to obtain the 435.9 nm blue emission.

The dopant effect may be used in OPO applications, to provide NCPM affording reduced spectral linewidths in addition to the other benefits mentioned above. Wavelengths of interest include the eye-safe wavelength near 1.6 $\mu$m for surgical applications and the 3-5 $\mu$m region for atmospheric applications such as remote sensing and tracking. Birefringence tuning can be use to achieve NCPM at 1.6 μm and 3.17 μm output of a KTP OPO pumped by Nd:YAG at 1.06 μm.

In accordance with this invention, a nonlinear optical device is provided which includes a doped crystal as described herein, and input means for directing electromagnetic radiation into the crystal for type II phase matching. The input means is adapted to provide input waves suitable for generating output waves at an optical birefringence (e.g., $n_z$-$n_x$ or $n_2$-$n_y$) higher than the highest corresponding ($n_z$-$n_x$ or $n_z$-$n_y$) optical birefringence of a crystal without said dopant (i.e., a crystal of MTiOXO$_4$ having the same M and X, but no dopant). The input means may be adapted by providing input waves having frequency characteristics different from waves which may be type II phase matched with undoped crystals (e.g., a higher frequency for SHG than the frequencies which can be used for SHG using an undoped crystal); and/or by providing a propagation direction in relation to the crystal different from a direction which can be used for type II phase matching using the same input waves in an undoped crystal (e.g., NCPM frequency conversion with y propogation).

Figure 2:
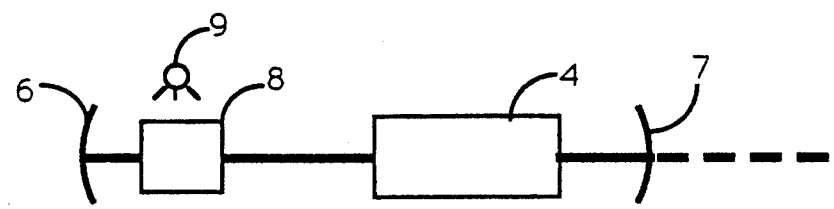
FIG. 2 is a schematic representation of a second device using doped KTP or doped KTA for SHG.
Figure 3:
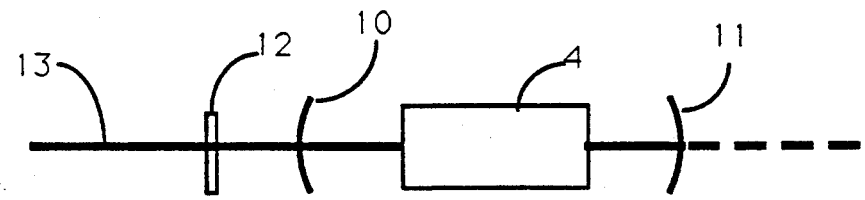
FIG. 3 is a schematic representation of a third device using doped KTP or doped KTA for SHG.
Figure 4:
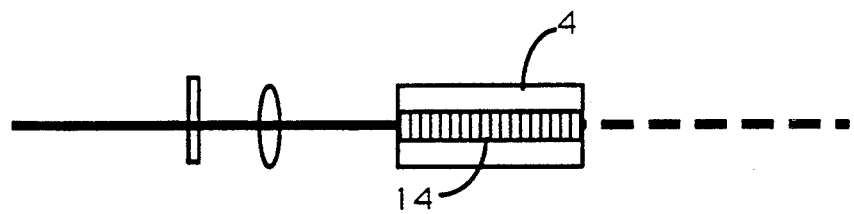
FIG. 4 is a schematic representation of a fourth device for using doped KTP or doped KTA for SHG.

A variety of devices in accordance with this invention are illustrated in FIGS. 1 through 9. FIGS. 1 through 4 can illustrate in diagrammatic form, optical devices utilizing an iron, niobium and/or tantalum doped KTP or KTA crystal for type II SHG at blue shifted wavelengths. As illustrated in FIG. 1, a linearly polarized laser beam (1) with wavelength shorter than 994.3 nm for KTP (or 1.074 μm for KTA) is polarized with a half-wave plate (2) for type II SHG. The beam, properly focused by a lens (3) is directed into a doped KTP or KTA crystal (4) which is precisely oriented for phase-matching. A second harmonic beam (5) with wavelength shorter than 497 nm for KTP (or shorter than 539 nm for KTA) emerges from the crystal. As illustrated in FIG. 2, the doped crystal (4) can be placed inside a laser cavity having multiple reflecting surfaces represented by (6) and (7), a gain medium (8) and a pump source (9). Other elements such as mirror, polarizer, wave plate, filter, grating, Q-switch, mode-locker, and Pockels cell (not shown) may also be included. As illustrated in FIG. 3, the doped crystal (4) can also be placed inside an external cavity comprising mirrors as represented by (10) and (11), used in combination with wave plate (12) and a laser pump source (13). As illustrated in FIG. 4, a waveguide consisting of regions of increased indices of refraction (14) on the doped crystal (4) can be used for efficient SHG. Additional structures to achieve balance phase-matching or feedback locking of the source laser may also be present in the waveguide.

FIGS. 1 through 4 can also illustrate in diagrammatic form, optical devices utilizing an iron, niobium and/or tantalum doped KTP or KTA crystal for type II NCPM SHG at a given wavelength. For these embodiments, in the device of FIG. 1, a laser beam (1) having a selected wavelength is polarized for type II SHG in the doped crystal using a half-wave plate (2). The polarized beam, properly focused using lens (3) is directed into the doped crystal (4) along its x or y axis. The doped crystal is precisely doped in accordance with this invention to obtain NCPM for the selected wavelength such that the exiting beam (5) includes output waves having a wavelength equal to one half the wavelength of input waves of beam (1). As illustrated in FIG. 2, the doped crystal (4) can be placed inside a laser cavity having multiple reflecting surfaces (e.g., (6) and (7)), a gain medium (8) and a pump source (9). Other elements such as mirror, lens, waveplate, polarizer, filter, grating, Q-switch, mode-locker, and Pockels cell (not shown) may also be included. As illustrated in FIG. 3, the doped crystal can also be placed inside an external cavity having mirrors (10) and (11), and is pumped by a laser beam (13). As illustrated by FIG. 4, a waveguide consisting of regions of increased indices of refraction (14) on the doped crystal can be used for efficient NCPM SHG. Additional structures to achieve balance phase-matching or feedback locking of the source laser may also be present in the waveguide.

Figure 5:
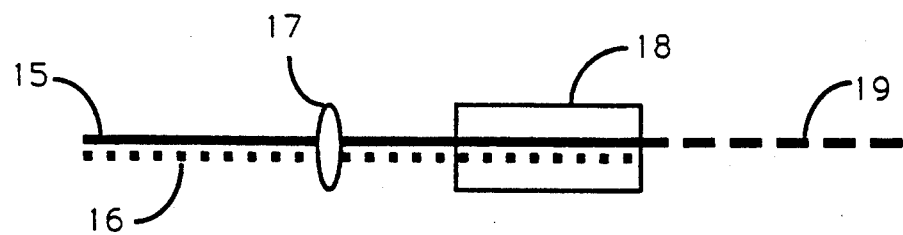
FIG. 5 is a schematic representation of a device for using KTP or doped KTA for SFG.
Figure 6:
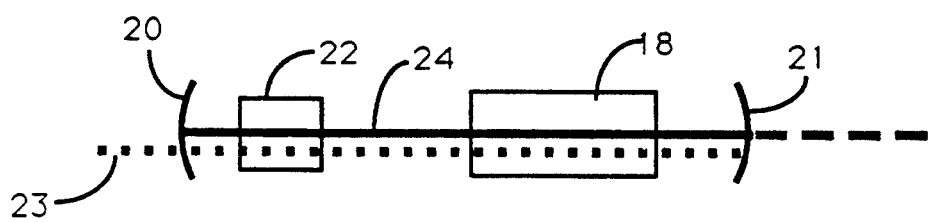
FIG. 6 is a schematic representation of a second device for using doped KTP or doped KTA for SFG.
Figure 7:
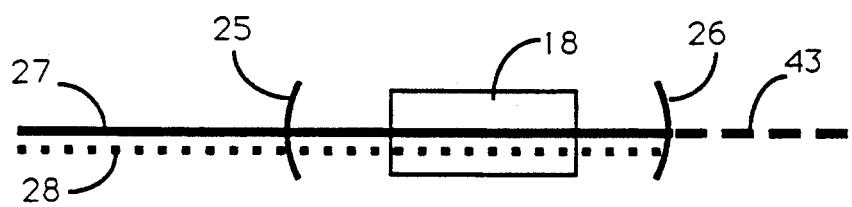
FIG. 7 is a schematic representation of a third device for using doped KTP or doped KTA for SFG.
Figure 8:
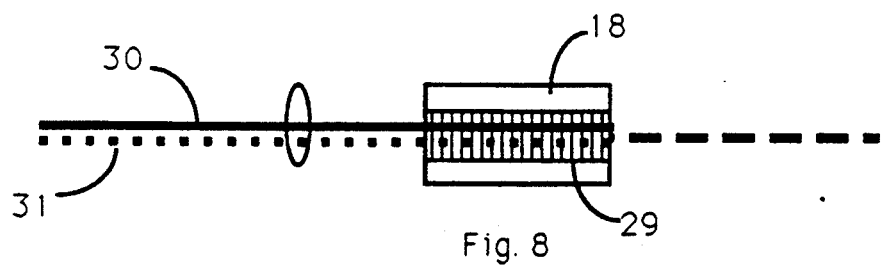
FIG. 8 is a schematic representation of a fourth device for using doped KTP or doped KTA for SFG.

FIGS. 5 through 8 illustrate in diagrammatic form, optical devices utilizing an iron, niobium and/or tantalum doped KTP or KTA crystal for NCPM type II SFG of a given wavelength. As illustrated in FIG. 5, two laser beams (15) and (16), with appropriate wavelengths, are polarized for type II SFG. The beams, properly focused by lens (17) are directed into a doped KTP or KTA crystal (18) along its x or y axis. The crystal (18) is precisely doped in accordance with this invention to obtain NCPM for particular wavelengths of input waves from beams (15) and (16). A laser beam (19) with waves having a sum frequency of said input waves from beams (15) and (16), emerges from the crystal. As illustrated in FIG. 6, the doped crystal (18) can be placed inside a laser cavity consisting of multiple reflecting surfaces, represented by (20) and (21), a gain medium (22) and a pump source (23) which may be a laser beam. SFG occurs between a lasing wavelength of beam (24) and the pump wavelength (23) which may also be resonated, or between the lasing wavelength and a third laser beam (not shown) which may also be resonated. Other elements such as mirror, lens, polarizer, waveplate, filter, grating, Q-switch, mode-locker, and Pockels cell (not shown) may also be included. As illustrated in FIG. 7, the doped crystal (18) can be placed inside an external cavity having mirrors, as represented by (25) and (26), and is pumped by two laser beams (27) and (28) to produce beam (43). As illustrated using FIG. 8, a waveguide consisting of regions of increased indices of refraction (29) on the doped crystal (18) can be used for efficient SFG. Two laser beams (30) and (31), with appropriate wavelengths are coupled into the waveguide. Additional structures to achieve balance phasematching or feedback locking of the source laser may also be present in the waveguide.

Figure 9:
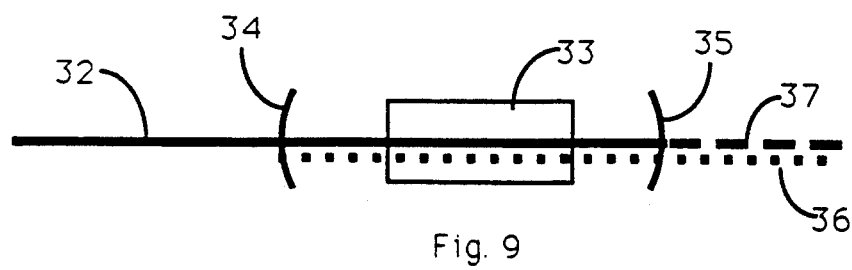
FIG. 9 is a schematic representation of a device for using doped KTP or doped KTA for OPO.

FIG. 9 diagrammaticly illustrates directing a pump laser beam (32) appropriately polarized for type II interaction, along the x or y axis of a doped KTP or KTA OPO comprising a doped KTP or KTA crystal (33) and multiple reflecting elements represented by (34) and (35). The crystal is precisely doped with iron, niobium and/or tantalum to obtain NCPM OPO of a specific wavelength. This wavelength can be the signal wave (36) or the idler wave (37).

Practice of the invention will become apparent from the following non-limiting examples.

EXAMPLES

Single crystals of KTP or KTA were grown by the flux technique. Iron or niobium dopants were added into the flux prior to crystal growth. The dopant concentration in the flux grown crystals was characterized with either inductively coupled plasma-atomic emission spectroscopy or energy dispersive x-ray spectroscopy. For each doped crystal, a (001) plate and an (abc) block were cut and polished. The refractive indices were obtained by measuring the critical angle of total internal reflection between the (001) plate and a stress-free cubic zirconia prism. The prism was placed in contact with the (001) surface of the crystal, and the crystal was oriented such that either its x or y axis was in the plane of incidence. Radiation generated by a HeNe laser was directed through the prism and into the crystal. By measuring the critical angle at which the TE and TM modes of the laser stopped propagating into the crystal, the indices of refraction were calculated. The y-propagating cut-off wavelength was obtained with a Ti:sapphire laser. The laser was polarized for type II SHG and focused onto the y faces of the (abc) block. The wavelength of the Ti:sapphire laser was monitored with a wavemeter and tuned to maximize SHG. The type II SHG phase-matching angle of KTP was measured with the (abc) block mounted on an accurate rotational stage. A Nd:YAG laser operating a 1.064 μm was used.

EXAMPLE 1

The KTiOAsO$_4$ crystals were grown from a molten solution mixture of 208.7 g of WO$_3$, 207.3 g of K$_2$CO$_3$, 137.9 g As$_2$O$_5$, 24 g of TiO$_2$ and 1.0 g of Fe$_2$O$_3$ (i.e., 0.6 weight % doping in the melt). The crystal growth takes place by the technique of slow cooling (from 866° C. to 826° C. at a rate of about 0.05° C./hr.) in a substantially isothermal, top-loading furnace. A commercial crystal rotation and pulling assembly was used to create force convection by spinning the seed at 5-30 rpm, with the direction of rotation reversed every 20 seconds. As grown, crystals are typically 20×15×25 mm$^3$ and contain about 0.3-0.5 weight % Fe impurities.

In a 0.47 weight % iron doped KTA crystal, an increase in $n_z$-$n_x$ (birefringence) of 0.0086 and in $n_z$-$n_y$ of 0.0060 was measured. A blue shift of 37 nm was observed for the y-propagating cut-off wavelength.

EXAMPLE 2

KTP crystals doped with 0.2 weight % Fe were grown by spontaneous nucleation from a molten solution mixture of 210 g of K$_2$HPO$_4$, 14.2 g P$_2$O$_5$, 65.6 g of K$_2$WO$_4$, 186 g of WO$_3$, 14.8 f of Li$_2$CO$_3$, 48 g of TiO$_2$, and 1.0 g of Fe$_2$O$_3$ (i.e., 0.2 wt % doping in the melt). The temperature was cooled at 0.4° C./hr. from 1000° C. to 680° C., and the crystals were recovered by pouring off the flux and etching in hot water.

In a 0.2 weight % iron doped KTP crystal, an increase in $n_z$-$n_x$ of 0.0042 and in $n_z$-$n_y$ of 0.0026 and a blue shift of y-cut-off of 17 nm were observed. A 3° decrease in type-II SHG phase-matching angle at 1.064 μm was also observed.

EXAMPLE 3

The K$_{0.99}$Ti$_{0.99}$Nb$_{0.01}$OPO$_4$ crystal was grown from a molten solution mixture 298.4 g of K$_2$CO$_3$, 223.8 g P$_2$O$_5$, 64.5 g of TiO$_2$, and 2.2 g of Nb$_2$O$_5$. The crystal growth procedure was the same as in Example 1, except for the temperature, which was from 910° C. to 854° C.

In a niobium doped KTP crystal, an increase in $n_z$-$n_x$ of 0.0039 and in $n_z$-$n_y$ of 0.0030, a blue shift of y propagating cut-off of 15 nm, and a 9° decrease in type-II SHG phase-matching angle at 1.064 μm were observed.

EXAMPLE 4

The K$_{0.96}$Ti$_{0.96}$Nb$_{0.04}$OAsO$_4$ crystal was grown from a molten solution mixture 319.5 g of K$_2$WO$_4$, 319.5 g of Li$_2$WO$_4$, 101.6 g of K$_2$CO$_3$, 168.9 g As$_2$O$_5$, 39.1 g of TiO$_2$, and 6.5 g of Nb$_2$O$_5$. The crystal growth procedure was the same as in Example 1, except for the temperature, which was between from 909° C. to 870° C.

In the niobium doped KTA crystal, an increase in $n_z$-$n_x$ of 0.0103 and in $n_z$-$n_y$ of 0.0073 was measured.

EXAMPLE 5

The K$_{0.90}$Ti$_{0.90}$Nb$_{0.10}$OPO$_4$ crystal was grown from a molten solution mixture 317.1 g of K$_2$CO$_3$, 237.8 g P$_2$O$_5$, 55.9 g of TiO$_2$, and 23.3 g of Nb$_2$O$_5$. The crystal growth procedure was the same as in Example 1, except for the temperature, which was between from 901° C. to 858° C.

The optical birefringence $n_z$-$n_x$ was measured to be 0.1282 corresponding to an increase of 0.0252. A blue shift of y propagating type II SHG cut-off of 68 nm was also observed.

EXAMPLE 6

KTA crystals co-doped with Fe and Nb were grown by spontaneous nucleation from a molten solution mixture of 252 g of KH$_2$AsO$_4$, 230 g of K$_2$WO$_4$, 52 g of Li$_2$WO$_4$, 48 g of TiO$_2$, 4.0 g Nb$_2$O$_5$, and 2.4 g of Fe$_2$O$_3$. The temperature was cooled at 1° C./hr. from 1000° C. to 750° C., and the crystals were recovered by pouring off the flux and etching in hot water. The final crystals were analyzed and found to have the composition (K$_{0.93}$Ti$_{0.93}$Fe$_{0.03}$Nb$_{0.04}$OAsO$_4$). The optical birefringence $n_z$-$n_x$ was measured to be 0.1123, an increase of 0.0156.

EXAMPLE 7

The K$_{0.97}$Ti$_{0.97}$Ta$_{0.03}$OPO$_4$ crystal was grown from a molten solution mixture of 321.5 g of K$_2$CO$_3$, 242.4 g P$_2$O$_5$, 72.1 g of TiO$_2$, and 8.3 g of Ta$_2$O$_5$. The crystal growth procedure was the same as in Example 1, except for the temperature, which was between from 957° C. to 921° C.

An increase of 0.0142 in $n_z$-$n_x$ birefringence and a y-propagating type-II SHG cut-off of 943.6 nm were observed for a 3% tantalum doped KTP crystal.

Particular embodiments of the invention are illustrated herein. Other embodiments will become apparent to those skilled in the art from a consideration of the specification or practice of the invention disclosed herein. It is understood that modifications and variations may be practiced without departing from the spirit and scope of the novel concepts of this invention. It is further understood that the invention is not confined to the particular formulations and examples herein illustrated, but it embraces such modified forms thereof as come within the scope of the following claims.

What is claimed is:

1. A method for phase matching including the steps of directing electromagnetic radiation into a crystal having nonlinear optical properties, and generating output waves from said crystal having a selected wavelength different from the wavelength of input waves to said crystal using type II phase matching, characterized by:

said crystal consisting essentially of doped MTiOXO$_4$ wherein M is selected from the group consisting of K, Rb and Tl and mixtures thereof and X is selected from P, As, and mixtures thereof, said crystal containing at least one dopant selected from the group consisting of Fe, Nb, and Ta in an amount, totalling at least about 100 ppm, effective to increase the $n_z$-$n_x$ optical birefringence of the doped crystal at least about 0.001 compared to a crystal without said dopant; and said output waves being generated in said crystal from said input waves at an optical birefringence higher than the highest corresponding optical birefringence of a crystal without said dopant.

2. The method of claim 1 wherein X is P.

3. The method of claim 1 wherein the crystal consists essentially of doped KTiOPO$_4$.

4. The method of claim 2 or claim 3 wherein second harmonic generation is achieved at an input wavelength of less than 0.994 microns.

5. The method of claim 1 wherein X is As.

6. The method of claim 1 wherein the crystal consists essentially of doped KTiOAsO$_4$.

7. The method of claim 5 or 6 wherein second harmonic generation is achieved at an input wavelength of less than 1.074 microns.

8. A nonlinear optical device comprising a nonlinear optical crystal and input means for directing electromagnetic radiation into said crystal to generate output waves from said crystal having a selected wavelength different from the wavelength of input waves to said crystal using type II phase matching, characterized by:

said crystal consisting essentially of doped MTiOXO$_4$ wherein M is selected from the group consisting of K, Rb, Tl and mixtures thereof and X is selected from the group consisting of P, As and mixtures thereof, said crystal containing at least one dopant selected from the group consisting of Fe, Nb, and Ta in an amount, totalling at least about 100 ppm, effective to increase the $n_z-n_x$ optical birefringence of the doped crystal at least about 0.001 compared to a crystal without said dopant; and said input means being adapted to provide input waves suitable for generating said output waves at an optical birefringence higher than the highest corresponding optical birefringence of a crystal without said dopant.

9. The device of claim 8 wherein said crystal consists essentially of doped KTiOPO$_4$.

10. The device of claim 8 wherein said crystal consists essentially of doped KTiOAsO$_4$.

11. A crystal consisting essentially of doped MTiOXO$_4$ containing at least about 100 ppm Ta, wherein M is selected from the group consisting of K, Rb, Tl and mixtures thereof and X is selected from the group consisting of P, As and mixtures thereof.

12. The crystal of claim 11 wherein M is K and X is P.

* * * * *